Oct. 19, 1971 J. L. SHIELDS Re. 27,197
IGNITION SYSTEM
Original Filed June 7, 1966
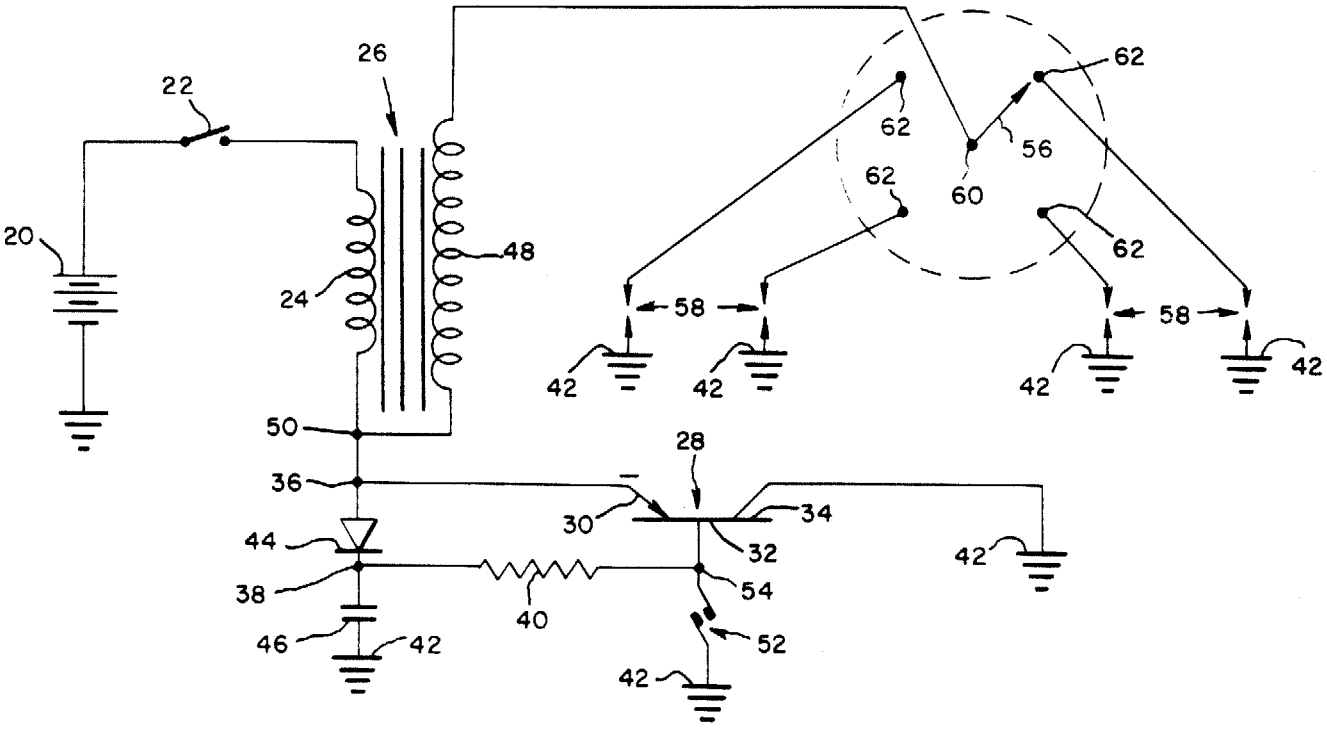
INVENTOR
JAMES L. SHIELDS United States Patent Office Re. 27,197
Reissued Oct. 19, 1971

27,197
IGNITION SYSTEM

James L. Shields, Linton, Ind., assignor to
Luvals, Inc., Linton, Ind.

Original No. 3,406,671, dated Oct. 22, 1968, Ser. No. 555,852, June 7, 1966. Application for reissue Feb. 20, 1970, Ser. No. 13,213
Int. Cl. F02p *3/02*
U.S. Cl. 123—148 E 5 Claims

Matter enclosed in heavy brackets [ ] appears in the original patent but forms no part of this reissue specification; matter printed in italics indicates the additions made by reissue.

ABSTRACT OF THE DISCLOSURE

An ignition system for internal combustion engines which provides a hotter spark of shorter duration than that provided by standard ignition systems is disclosed. The self-induced (flyback) voltage of the primary winding of the ignition coil is utilized to drive the base electrode of a transistor positive with respect to the emitter electrode when the breaker points of the system open. The base electrode and the collector electrode of the transistor are both connected to ground potential when the ignition breaker points are closed, causing full conduction of the transistor and minimizing transistor junction temperature rise.

This invention relates to ignition system for igniting the combustible mixture of an internal combustion engine and more particularly to ignition systems wherein a semiconductor, such as a transistor, is used to control the current flow through the primary winding of an ignition coil.

The invention is applicable to generally known and used ignition systems of the kind in which a pair of breaker points control a supply of current from a battery to the primary winding of an ignition coil and the points are opened and closed to sequentially interrupt and connect the current supply whereupon a high voltage generated in the secondary winding of the coil is applied to a distributor system operated synchronously with the breaker points. The distributor system includes spark-plugs which initiate combustion of the fuel supplied to car cylinders of the engine with which the spark-plugs are associated.

One object of this invention is to provide an ignition system which will provide a spark which is hotter but of shorter duration than that provided by ignition systems now in general use, and thereby increase the useful life of the points and spark-plugs associated with the system.

It is an object of this invention to provide an improved ignition system, of the type described, wherein the self induced (flyback) voltage of the primary winding of the ignition coil is utilized to drive the base electrode of a transistor positive with respect to the emitter electrode when the breaker pojnts of the system open, thus causing an extremely sharp cut-off of conduction of the transistor, and a resulting high voltage in the secondary winding of the ignition coil.

Another object of this invention is to provide a transistor controlled ignition system wherein the collector electrode of the transistor is connected directly to the ground side of the system thereby eliminating insulated mounting of the transistor and consequently providing better heat dissipation and ease of installation.

A further object of this invention is to provide a transistor controlled ignition system wherein the transistor base-to-ground current aids the emitter-to-collector current in causing maximum current to flow through the primary winding of the ignition coil during the conduction cycle of the transistor.

Another object of this invention is to provide a transistor controlled ignition system wherein the transistor base electrode is at the same electrical potential as the collector electrode during the time that the ignition breaker points are closed, thus causing full conduction of the transistor and minimizing the rise in transistor junction temperature.

Another object of this invention is to provide a transistor controlled ignition system wherein the complete electronic controls can be attached to an ignition coil and the assembly thus made directly interchanged with an automobile's original ignition coil, thus eliminating the requirement for additional mounting holes, sub-chassis, heat sinks and wiring.

A further objective of this invention is to provide a transistor ignition system wherein the transistor is caused to alternately go from full conduction to full cut off during the respective closed and open conditions of the ignition system's breaker points, thus minimizing the rise in transistor junction temperature, and eliminating transistor thermal runaway.

One form of the invention is illustrated in the accompanying drawing.

Referring to the drawing, the reference numeral 20 designates a source of electrical power (normally a six volt storage battery) on a motor vehicle. One side of the storage battery 20 is connected directly to ground 42, as is shown, and the other side is connected to an ignition switch 22. The other side of the ignition switch 22 is connected to one side of the primary winding 24 of the ignition coil 26. The ignition coil illustrated is a standard type with a low impedance primary winding ranging from 0.5 to 1.5 millihenrys and with turn ratios of 250 to 1 to 400 to 1.

The ignition system of this invention includes a semiconductor such as a transistor 28 having an emitter electrode 30, a base electrode 32 and a collector electrode 34. Suitable transistors include those designated 2N174, 2N190, 2N2152 and others of similar characteristics and power ratings. The emitter electrode 30 is connected directly to the junction 36. The base electrode 32 is connected to junction 38 via junction 54 and the resistor 40 having a value of 100 to 500 ohms. The collector 34 of the transistor 28 is connected directly to the ground 42 side of the system. A rectifier diode 44 is connected between the junctions 36 and 38 and a capacitor 46 having a value of 0.1 mfd. ±20% at 400 WVDC. is connected between the junction 38 and the ground 42. A suitable rectifier diode 44 is the type commercially designated IN1692.

One side of the secondary winding 48 of the ignition coil 26 is connected to the junction 50 and the other side of the secondary winding 48 is connected to the center junction 60 of the ignition system's distributor cap. It should be noted that the secondary winding 48 of the ignition coil 26 is inductively coupled to the primary winding 24 and that one side of each winding is common to the junction 50.

Reference numeral 52 indicates a set of breaker points of which one side is connected directly to the base electrode 32 of the transistor 28 via the junction 54. The other side of the breaker points 52 is connected directly to ground 42 of the system. Opening and closing of the breaker points 52 are in synchronism with the operation of the engine, as is the rotation of the rotor contact 56. Thus the rotor contact 56 is oriented in such a manner that the ignition spark, which occurs when the breaker points 52 open, is distributed in sequence to the proper spark plug 58 to cause ignition of the combustible mixture within the respective cylinder of the engine.

It will be appreciated that the referenced drawing illustrates a transistor ignition system of the type described as applied to a four cylinder engine. It will also be appreciated that a transistor ignition system of the type described is applicable to internal combustion engines having less or more than four cylinders.

In operation of this system, when the engine is being cranked the breaker points 52 are caused to open and close by the cam action of the engine's distributor camshaft. With the ingnition switch 22 closed and the breaker points 52 closed, the base electrode 32 is connected directly to ground 42. Thus the transistor 28 is biased for optimum current condition from emitter to collector which causes maximum current to flow from the battery 20 through the primary winding 24 of the ignition coil 26 to ground 42 via the transistor's emitter electrode 30 and collector electrode 34.

It is important to observe that the small base current (which is characteristic of all transistors) is utilized in this invention to aid, instead of shunt, the current flow in the primary winding of the ignition coil. It is also important to observe that under this condition of operation there is no resistance between the base electrode 32 and the ground connection 42. Thus, there is no difference in the voltage potential of the base electrode 32 and the collector electrode 34. Hence, the voltage drop between the emitter electrode 30 and the collector electrode 34 is at a minimum. By this arrangement it is seen that the operating temperature of the transistor 28 is maintained at a very low level.

When the beaker points 52 open, the base electrode 32 of the transistor 28 is no longer connected to ground thus the electrical potential of the junction 38 (which is positive with respect to the emitter electrode 30) is applied to the base electrode 32 via the resistor 40 thus causing sharp conduction cut-off of the transistor 28. The sharp conduction cut-off of the transistor 28 causes a sharp cut-off of current flow through the primary winding 24 of the ignition coil 26. The resultnig high voltage which is induced in the secondary winding 48 of the ignition coil 26 is applied to the proper spark plug 58 via the junction 60, the rotor contact 56, and a junction 62, thus causing ignition of the combustible mixture within the respective cylinder of the engine. At the same time that the induced high voltage occurs in the secondary winding 48 of the ignition coil 26, a self induced voltage occurs in the primary winding 24. This voltage, which is of a considerably higher potential than that of the storage battery 20, is applied to the capacitor 46 via the diode 44 thus establishing a positive voltage potential at the junction 38. This voltage is applied to the base electrode 32 via the resistor 40 and thus maintains conduction cut-off of the transistor 28 while the beaker points 52 are open. When the breaker points 52 close, the junction 54 and hence the base electrode 32 are connected to the ground 42 and the positive voltage at the junction 38 is dropped across the resistor 40. A voltage of the proper polarity and magnitude at the junction 38, is thus maintained, to cause sharp conduction cut-off of the transistor 28 when applied to the base electrode 32 via the resistor 40 as will be the condition when the breaker points 52 are again caused to open.

The embodiments of this invention, as specifically disclosed herein, constitute presently prefered forms, and it is to be understood that the invention is not limited to the specific disclosure or by the value of the various components which are mentioned in the disclosure solely for the purpose of describing one complete and operable form of the invention; but that the nature of the invention is indicated in the objectives set forth above and is particularly and distinctively claimed hereinafter.

What I claim as my invention is:

1. In an ignition system for internal combustion engines of the kind in which a pair of breaker points control a supply of current from a battery to the primary winding of an ignition coil and are opened and closed to sequentially interrupt and connect the current supply whereupon a voltage generated in the secondary winding of the ignition coil is applied to a distributor system operated synchronously with the breaker points: a transistor having its emitter electrode connected to the primary winding of said ignition coil, and the collector electrode of the transistor and one of the breaker points being connected to the same potential level, the other breaker point being connected directly to the base electrode of the transistor, [and a circuit connecting said primary winding and said other breaker point in parallel with said transistor, said circuit containing current limiting means and dode means to prevent reverse current flow therethrough,] *diode means to prevent reverse current flow therethrough and energy storage means serially connected in parallel with the emitter electrode-base electrode-collector electrode path of said transistor, current limiting means connecting the other breaker point to the junction between said diode means and said energy storage means so that the discharge path of said energy storage means through said closed breaker points to said same potential level includes said current limiting means whereby current flow through the transistor is immediately cut off upon the opening of the breaker points and* whereby current flow through the transistor commences immediately and remains at a high level upon closing of the breaker points without causing an undesirable temperature rise in the transistor.

2. The improvements in an ignition system as claimed in claim 1 in which the potential level is ground.

3. The improvement in an ignition system as claimed in claim 1 having circuit means connecting the primary winding of the ignition coil to said base electrode for applying the self-induced flyback voltage in the primary winding of the ignition coil upon opening of the breaker points to said base electrode, whereby current flow through the transistor is cut-off sharply to produce high voltage in the secondary winding of the ignition coil.

4. The improvement in an ignition system as claimed in claim 3 in which said circuit means includes a capacitor-resistance network and a rectifier connected between said capacitor and said primary winding, whereby the cut-off of the current flow through the transistor upon opening of the breaker points is maintained during the entire time the breaker points remain open and the transistor is switched from full conduction to beyond conduction cut-off upon closing and opening, respectively, of said breaker points.

5. An ignition system wherein the primary circuit is directly connected with a source of electronic potential, and by transistor controlled switching from this source to ground potential through an emitter collector circuit of the transistor switching, a parallel connected switching circuit from primary to ground through engine driven breaker points, means directly connecting the base of the transistor switching with ground through said breaker points, a current limiting means in the parallel switching circuit, a diode poled to prevent current reverse flow between the switching circuits, and capacitor means connected to be charged by current flow from the primary through the diode when the switching circuits open and connected to reverse bias the base emitter circuit of the transistor switching through the parallel connected switching circuit while this circuit is open and then discharge when the breaker points close.

References Cited

The following references, cited by the Examiner, are of record in the patented file of this patent or the original patent.

UNITED STATES PATENTS

| | | | |
|---|---|---|---|
| 3,324,351 | 6/1967 | Pahl, Jr. | 315—219 |
| 2,966,615 | 12/1960 | Meyer et al. | |
| 3,016,477 | 1/1962 | Naborowski. | |
| 3,319,618 | 5/1967 | Sohner. | |

LAURENCE M. GOODRIDGE, Primary Examiner

U.S. Cl. X.R.

315—209

UNITED STATES PATENT OFFICE
CERTIFICATE OF CORRECTION

Patent No. RE 27,197 Dated October 19, 1971

Inventor(s) JAMES L. SHIELDS

It is certified that error appears in the above-identified patent and that said Letters Patent are hereby corrected as shown below:

Column 2, line 47 - "2N190" should be -- 2N1970 --.

Column 3, line 25 - "condition" should be -- conduction --.

Column 3, line 64 - "beaker" should be -- breaker --.

Column 4, line 26 - "dode" should be -- diode --.

Signed and sealed this 28th day of March 1972.

(SEAL)
Attest:

EDWARD M.FLETCHER,JR.
Attesting Officer

ROBERT GOTTSCHALK
Commissioner of Patents